Figure 1:
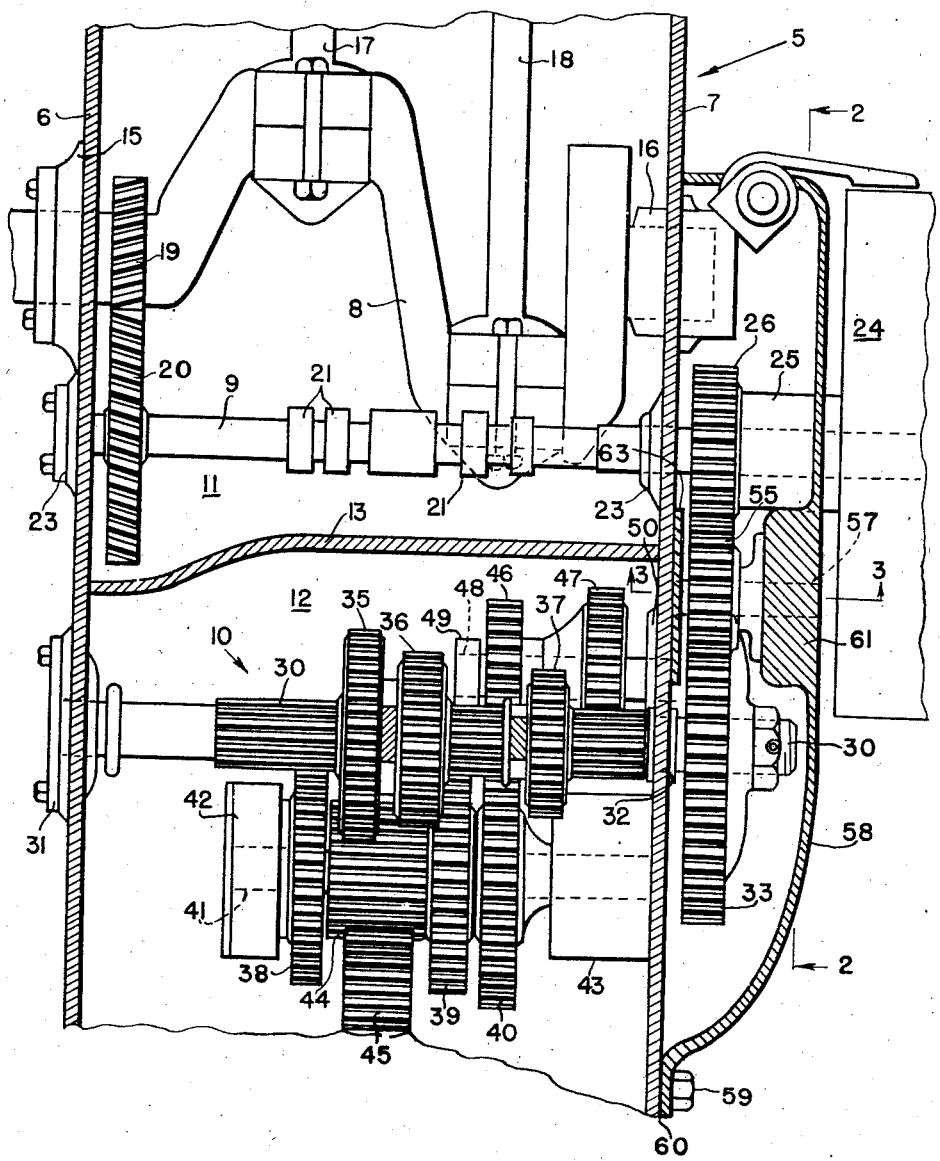

Jan. 26, 1943.  E. McCORMICK  2,309,199
TRACTOR TRANSMISSION
Filed March 8, 1941  2 Sheets-Sheet 1

INVENTOR:
ELMER MC CORMICK
BY
ATTORNEYS.

Jan. 26, 1943.  E. McCORMICK  2,309,199
TRACTOR TRANSMISSION
Filed March 8, 1941  2 Sheets-Sheet 2
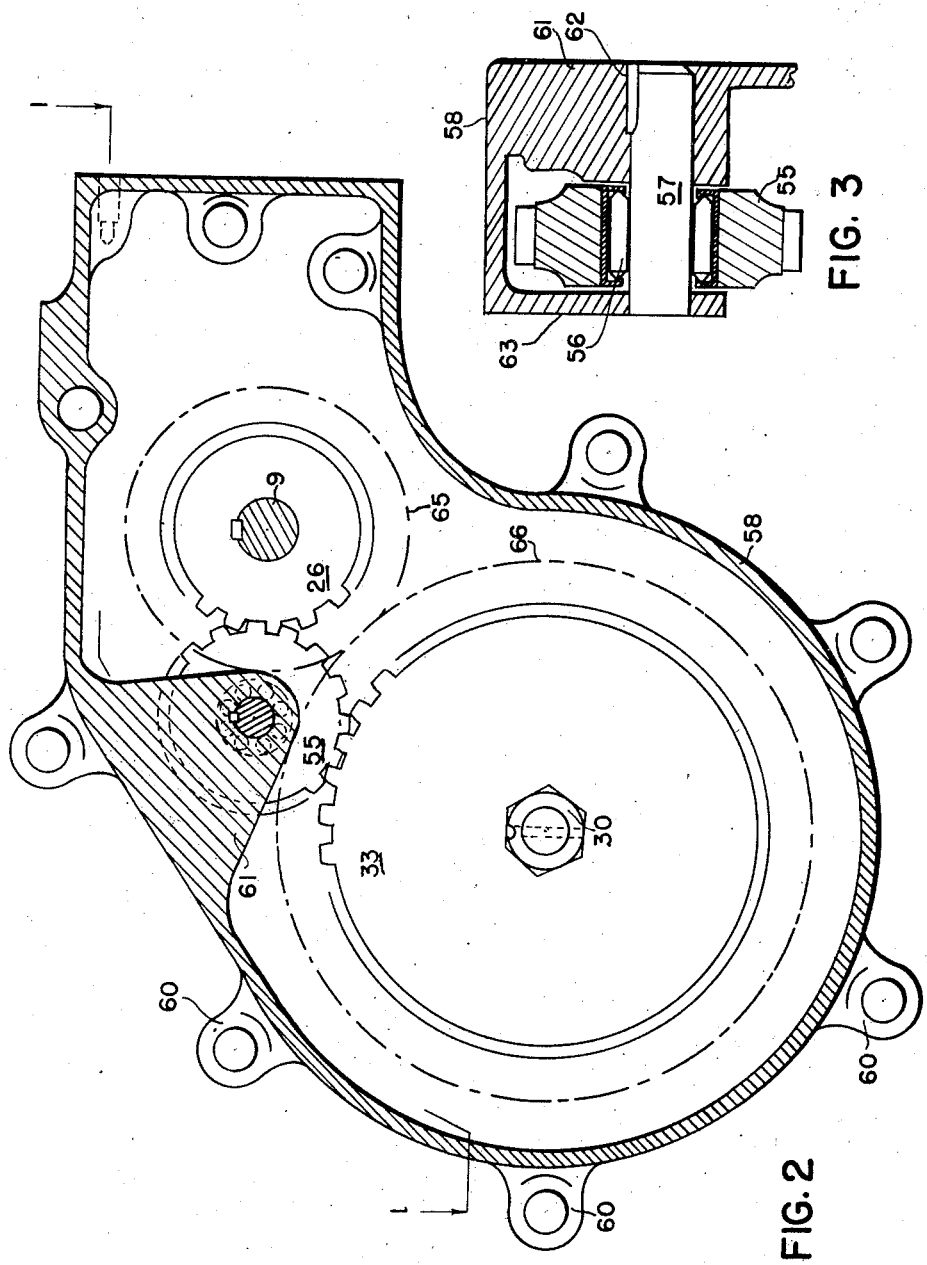
INVENTOR:
ELMER MC CORMICK
BY
ATTORNEYS.

Patented Jan. 26, 1943

2,309,199

UNITED STATES PATENT OFFICE 2,309,199

TRACTOR TRANSMISSION

Elmer McCormick, Waterloo, Iowa, assignor to John Deere Tractor Company, Waterloo, Iowa, a corporation of Iowa Application March 8, 1941, Serial No. 382,384

1 Claim. (Cl. 74—325)

The present invention relates generally to tractor transmissions and has for its principal object the provision of a readily attachable and detachable reversing gear by means of which the tractor can be driven backwards in any of the gear ratios normally used for forward speeds.

Agricultural tractors are sometimes used with certain types of implements mounted on the rear of the tractor, and the latter is then driven in reverse gear so that the implement leads the tractor during operation. When the normal reverse gear connection in the tractor transmission is used for driving the tractor, however, the speed of travel of the tractor and implement is sometimes either too fast or too slow, making it desirable to have several gear combinations from which to choose, as when the tractor is operated in normal forward service. Although it is conventional to provide several gear changes for reverse operation as well as forward operation in certain types of vehicles and tractors, farm tractors are very seldom so equipped because of the comparatively high cost and weight of such equipment.

In accordance with the principles of the present invention, a conventional type of farm tractor can be readily converted so that the tractor can be driven backwards in any of the conventional forward gear ratios, and then at any time can be readily reconverted for normal operation. Certain tractors well known to those skilled in the art, are provided with a first gear reduction in the form of a pair of intermeshing gears outside of the transmission housing of the tractor in a separate gear enclosure, from which the usual change speed transmission gears within the housing are driven. According to the principles of the present invention, the two gears of the first gear reduction are replaced by two slightly smaller gears which do not mesh together, and an idler gear is interposed between the two gears, thus obtaining a reversal of rotation of the gears of the change speed transmission within the housing. This idler gear is mounted within and supported by a detachable gear cover which can be substituted for the usual casing around the first pair of reduction gears outside of the main transmission housing.

These and other objects and advantages of my invention will be apparent to those skilled in the art after a study of the following description in which reference is had to the drawings appended hereto, in which Figure 1 is a sectional plan view of the transmission housing of a tractor embodying the principles of the present invention, and including an external gear casing cut away along a line 1—1 in Figure 2;

Figure 2 is a sectional elevational view of the external gear casing taken along a line 2—2 in Figure 1; and Figure 3 is a sectional elevation drawn to an enlarged scale, showing the idler gear mounted as viewed along a line 3—3 in Figure 1.

Referring now to the drawings, the body of the tractor, indicated generally by reference numeral 5, includes a pair of side walls 6, 7 defining the sides of a main housing enclosing a crank shaft 8, cam shaft 9, and change speed transmission mechanism, indicated generally by reference numeral 10. The crank case 11 is divided from the transmission housing or enclosure 12 by means of a partition 13. The crank shaft 8 is supported in a pair of transversely aligned journal bearings 15, 16, and is connected by a pair of connecting rods 17, 18 to the two pistons (not shown) of the internal combustion engine. This engine is preferably of the well-known type having two horizontal cylinders extending longitudinally of the tractor and spaced side by side. The crank shaft 8 drives through a pair of intermeshing gears 19, 20, fixed at one end of the crank shaft 8 and cam shaft 9, respectively, the latter being provided with the usual cams 21 for operating the engine valves in a manner well-known to those skilled in the art and which therefore need not be shown and described in detail in this description. The cam shaft 9 is also transversely disposed for rotation about an axis generally parallel to the axis of rotation of the crank shaft and is supported in a pair of transversely aligned bearings 22, 23 supported on the walls 6, 7, respectively, one end of the cam shaft 9 extending outwardly through the wall 7 to a conventional clutch mechanism (not shown) mounted within a belt pulley 24. The details of this clutch mechanism form no part of the present invention, reference being made to Patent No. 1,702,371, issued February 19, 1929, to Witry, which discloses a clutch of this general type. It is therefore sufficient to say that the shaft 9 drives a sleeve 25 through the aforementioned clutch mechanism. The sleeve 25 encircles the projection of the shaft 9 outside of the main housing wall 7 and carries a gear 26 mounted on the end of the sleeve 25.

The tractor change speed gear mechanism 10 comprises a splined shaft 30 disposed transversely of the tractor body 5 and journaled in transversely aligned bearings 31, 32 carried in the opposite side walls 6, 7, respectively. The shaft 30 extends through a suitable aperture in the side wall 7, and on its projecting end outside the transmission housing 12, it supports a gear 33, which is rigidly secured to the shaft 30 for driving the latter. Slidably mounted on the splined shaft 30 are the usual slidable gears 35, 36, 37, which can be controlled by the tractor operator in the usual manner to slide into mesh with cooperative gears 38, 39, 40, which are rigidly fixed to a driven shaft 41. The driven shaft 41 is disposed transversely of the tractor body 5 and is journaled in laterally spaced bearings 42, 43, respectively. A drive pinion 44 is also fixed rigidly to the driven shaft 41 and drives the tractor wheels (not shown) through a further gear reduction mechanism including a gear 45, a portion of which is shown in Figure 1.

The usual back gears 46, 47 are provided on a countershaft 48 supported in bearings 49, 50, respectively.

As indicated in Figure 2, the gears 26, 33 outside of the main housing of the tractor are disposed out of mesh with each other, but are interconnected by means of an idler gear 55, which is interposed therebetween. The idler gear 55 is rotatably supported on an anti-friction bearing 56 on a shaft 57 which is rigidly supported in a gear casing 58, which encloses the three gears 26, 33, 55 outside the transmission housing 12. The casing 58 is in the form of a cover having inwardly turned sides which fit tightly against the side of the wall 7 of the main tractor housing 5 and are secured thereto by bolts 59 inserted through apertured lugs 60 extending outwardly from the cover 58 and engaging suitable tapped apertures in the side wall 7. As best indicated in Figure 3, the idler gear shaft 57 is supported at one end in a boss 61, formed integrally with the cover 58 and is keyed thereto by means of a key 62 to prevent rotation therein. The other end of the shaft 57 is supported in an inwardly extending ear 63, also formed integrally with the cover 58. Thus, the idler gear 55 is permanently mounted in the detachable cover 58 and is therefore removable therewith.

With the idler gear 55 interposed between the gears 26, 33, the tractor has three speeds for running backwards and one speed for running forward. The three backward speeds are obtained by first shifting the slidable gear 37 into mesh with the gear 40 on the driven shaft, second, by shifting gear 36 into mesh with gear 39, and, third, by meshing gear 35 with gear 38. The one forward speed is obtained by shifting gear 37 toward the right into mesh with gear 47 on the countershaft, which in turn drives through gear 46 which is in mesh with gear 40 on the driven shaft.

When it is desired to use the tractor in a conventional manner with three speeds forward and one reverse, the cover casing 58 is removed by removing bolts 59 from the lugs 60, and the gears 26, 33 on the engine driven shaft 9, the sleeve 25, and splined shaft 30, respectively, are replaced by a pair of larger gears indicated by the pitch circles 65, 66, respectively. These two gears have intermeshing teeth and therefore by eliminating the extra idler gear 55, the tractor is driven forward instead of backward through its three gear connections, whereas it is driven backward through the back gears 46, 47. With the larger gears 65, 66 in position, the conventional gear case (not shown) is used, the latter being similar to the case 58 but without the idler gear 55.

I claim:

For use in a tractor transmisison comprising a housing for change speed gearing, a drive shaft therefor extending out of the housing, and an engine driven shaft mounted adjacent said drive shaft and adapted to be normally connected thereto by a pair of dismountable meshing gears outside said housing, means for optionally driving said tractor backwards in any normally forward connection of change-gears, comprising in combination, a pair of dismountable non-meshing gears adapted to be mounted on said shafts outside said housing after said meshing gears have been removed, a gear cover for enclosing said gears, detachable means for rigidly attaching said cover outside said housing, and an idler gear rotatably mounted on the inner side of said cover and adapted to mesh with both of said non-meshing gears to transmit power therebetween.

ELMER McCORMICK.